(12) United States Patent
Haug et al.

(10) Patent No.: US 6,716,376 B1
(45) Date of Patent: Apr. 6, 2004

(54) METHOD FOR PRODUCING A FIBER COMPOSITE

(75) Inventors: Tilmann Haug, Uhlidingen (DE); Kolja Rebstock, Ulm (DE); Christian Schwarz, Ulm (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/622,123

(22) PCT Filed: Jan. 30, 1999

(86) PCT No.: PCT/EP99/00611

§ 371 (c)(1),
(2), (4) Date: Nov. 1, 2000

(87) PCT Pub. No.: WO99/41069

PCT Pub. Date: Aug. 19, 1999

(30) Foreign Application Priority Data

Feb. 13, 1998 (DE) .......................... 198 05 868

(51) Int. Cl.$^7$ .......................... C04B 35/573
(52) U.S. Cl. ............... 264/29.1; 264/112; 264/113; 264/120; 264/640; 264/641; 264/642; 264/643
(58) Field of Search .................. 264/112, 113, 264/120, 640, 641, 642, 643, 29.1

(56) References Cited

U.S. PATENT DOCUMENTS 4,837,230 A * 6/1989 Chen et al. .................... 501/88
5,354,398 A * 10/1994 Kawai .......................... 156/89
5,424,109 A * 6/1995 Baetz .......................... 428/113
5,741,457 A * 4/1998 Iida et al. ................... 264/40.4
6,022,502 A * 2/2000 Lockhart ..................... 264/113
6,086,814 A * 7/2000 Krenkel et al. ............. 264/610

FOREIGN PATENT DOCUMENTS

EP 0528131 * 2/1993
EP 0643023 * 3/1995

OTHER PUBLICATIONS

Derwent Acc No 1989–012429, Dec. 1995.*

* cited by examiner

Primary Examiner—James Derrington
(74) Attorney, Agent, or Firm—Crowell & Moring LLP

(57) ABSTRACT

The invention relates to a process for producing a fiber composite material containing fibers with a high hot strength, in particular based on carbon, silicon, boron and/or nitrogen, a pressing compound being produced from fibers, a binder and, if appropriate, fillers and/or additives, which is then pressed in a press mold to form a green body. Various pressing compounds are produced, which contain fibers of different qualities and/or in different proportions, and the press mold is filled with the various pressing compounds in a number of successive steps. The invention also relates to a fiber composite material of this nature.

14 Claims, 4 Drawing Sheets

METHOD FOR PRODUCING A FIBER COMPOSITE

This invention relates to a process for producing a fiber composite material and to a fiber composite material containing fibers with a high hot strength, a pressing compound produced from fibers, a binder and, if appropriate, fillers and/or additives. More particularly, the fibers are based on carbon, silicon, boron, and/or nitrogen. The mass is then pressed in a press mold to form a green body.

A process of the generic type and a ceramic composite material of the generic type are described in German Patent Application 197 11 829.1, which is not a prior publication. The reinforcing fibers which are known from this document are fibers with a high hot strength which are present in the form of short fiber bundles. The fiber bundles are impregnated with a binder which is suitable for pyrolysis. For this purpose, the fiber bundles are dipped into the binder. The binder is then solidified. Consequently, the fiber bundles are held together and mechanically reinforced. The fiber bundles are mixed with further binders and fillers and the mixture is hot-pressed to form a CRP body or "green body", which is then pyrolyzed in vacuo or under an inert gas to form a shaped body with a carbon matrix (C/C body). In the process, the fiber coating is also converted so that the fiber bundles are then coated with a layer of carbon. The shaped body is then infiltrated with molten silicon. The result is a C/SiC fiber composite material in which the fiber bundles are embedded in a matrix based on SiC. The short fiber bundles are embedded in the matrix in a randomly distributed form, with the individual filaments being substantially maintained. The carbon coating has reacted with the matrix material. As a result, the fiber bundles are protected from the aggressive attack from the molten silicon. This fiber composite ceramic exhibits very good tribological properties and, furthermore, is relatively inexpensive and easy to produce. It is suitable in particular for the production of brake discs and/or brake linings.

However, this material is unable to withstand particularly high mechanical loads, such as for example those which are generated by high vehicle masses or extreme speeds, since it is too brittle and insufficiently tolerant to damage to do so.

Various solutions have already been proposed in order to circumvent this problem. German Utility Model 296 10 498 describes a vehicle brake disc or vehicle clutch disc made from C-C/SiC composite material in which the disc has an SiC coating. Therefore, the outer region of the disc is made from ceramic material and provides very good frictional characteristics, while the core is a carbon body which, due to its pseudoductility, has high tolerance to damage. However, bodies that are coated in this way are complex and therefore expensive to produce. For this reason, they are only used for special applications, for example in motor racing.

European Patent Application EP 0 564 245 likewise describes a multilayer material which, however, has to be provided with a protective layer in order to prevent silicon from penetrating into relatively deep regions. This too is a highly complex and expensive process.

Therefore, the object of the invention is to provide a fiber composite material of the above type which offers an even higher strength and improved pseudoductility of the component. A further object of the invention is to provide a process for producing this material, making the material simple and inexpensive to produce and therefore suitable for series production.

The solution consists in a process for producing a fiber composite material containing fibers with a high hot strength, based on carbon, silicon, boron and/or nitrogen, which are reaction-bonded to a silicon-based matrix, a pressing compound being produced from fibers, binder and, if appropriate, filler and/or additives, which is then pressed in a press mold to form a green body, wherein various pressing compounds are produced, which contain fibers of different qualities and/or in different proportions, and the press mold is filled with the various pressing compounds in a plurality of successive steps and in a fiber composite material containing fibers made by the process. The fibers preferably have a layer of carbon and/or pyrolytic carbon.

The process according to the invention is distinguished by the fact that, to produce the green body, the press is successively filled with the various pressing compounds, the inner pressing compound comprising fibers of a core which is tolerant to damage, and the outermost pressing compound comprising fibers in a ceramicized frictional coating.

The material according to the invention is therefore a gradient material, the advantage of which lies in the extremely simple production process according to the invention.

According to the invention, during the production of the green body, the pressing compounds, during filling, are to be layered in the press mold in such a way that in the final component the frictional layer which has a high wear resistance and is largely ceramicized merges continually into a core which is tolerant to damage. In this way, the high wear resistance is combined with very good mechanical characteristics.

Therefore, if the mechanical loads on the component are extremely high, it is possible to further increase strength and extension characteristics, as can be demonstrated for example in the 3-point bending test. Under particularly high mechanical loads, such as for example those caused by high vehicle masses or extreme speeds, it is possible to adapt known processes for the low-cost production of fiber-reinforced composite ceramic in such a way that the material or the component offers a high strength and a very good resistance to wear on the outside, combined with a significantly increased pseudoductility on the inside.

The advantage of the process according to the invention is that there is no need to join layers with different properties using complex joining processes. In this case, the gradient is produced solely by the way in which the mold is filled. Due to the process used, the individual layers do not have any defined interlayers.

The filling heights required can be determined according to the particular application using tests on the compressibility of the various pressing compounds at constant pressure.

A highly ceramicized frictional layer on the component surface, for example the brake disc surface, is obtained by providing the fibers which have been processed in the pressing compound with coatings which make it possible for not only carbon-containing fillers and pyrolyzed binders but also carbon fibers to be partially converted by the molten silicon to form silicon carbide. This is achieved by applying known coatings in a suitably small thickness or using more reactive carbon-containing coatings.

As a result, the fibers which have been provided with a corresponding thin coating are relatively soft during processing to form the pressing compound. After mixing and pressing, they exhibit a high degree of interlacing. This means there are few, if any, spaces between them in which, for example, silicon can accumulate and therefore remain as unreacted residual silicon following the infiltration with liquid silicon. Furthermore, the fibers are reaction-bonded to the matrix. The result is a high proportion of ceramic fibers.

The frictional layer formed therefore has a high strength with an excellent tolerance to damage and is characterized by a high resistance to wear. A brake disc produced using this process has, for example, a high coefficient of friction with suitably adapted linings.

A layer of pyrolytic carbon (PyC) is applied to at least some of the reinforcement fibers used. Only then is a simple dip coating in accordance with the known process carried out.

These preferred reinforcement fibers are therefore each individually coated with two additional layers. The bottom layer, which is applied direct to the fiber, is made from pyrolytic carbon. A dip-coating which is known per se comprising a pyrolyzable binder is applied to this layer. During the infiltration of the porous shaped body with liquid silicon, the layer of carbon resulting from the resin coating acts as a "sacrificial layer". The liquid silicon reacts with this outer layer to form silicon carbide. This forms a diffusion barrier to the liquid silicon, which therefore cannot penetrate further into the fiber. The deeper layer of pyrolytic carbon and the reinforcement fibers in the core are not attacked.

The fibers which have been treated in this way are distinguished by a particularly high strength. The additional layer of pyrolytic carbon also produces optimum bonding of the reinforcement fibers to the matrix. They have a crack-diverting action and can slide in the longitudinal direction, resulting in the good results of the strength and 3-point bending tests. fiber-pullout effects are possible.

By using these reinforcement fibers during the production of the fiber composite material according to the invention, even in small proportions of the total fiber volume, it is possible to significantly increase the strength and extension figures, as can be demonstrated, for example, using the 3-point bending test. They do not impair the other parameters.

By coating the PyC fibers with a resin solution, it is possible to use these fibers even for silicized materials.

The process for producing these reinforcement fibers is distinguished by the fact that carbon fibers are firstly coated with pyrolytic carbon. This term is understood to mean both pyrolyzed dip coatings, such as for example pitch, and layers deposited from the vapor phase. The fibers are then provided with pyrolyzable plastic material.

The coating with pyrolytic carbon may, on the one hand, be carried out by dip coating, for example by dipping into a pitch bath. This process is suitable in particular for long fibers. Alternatively, a CVD coating, for example using methane in a reactor, may be applied to the fibers. This process is eminently suitable for both long fibers and short fibers.

The use of pitch has the advantage that the pyrolytic carbon layer formed is crystalline carbon which reacts with liquid silicon significantly more slowly than a layer of amorphous carbon, as is formed, for example, when a phenolic resin is used. As a result, the diffusion barrier for the amorphous carbon is strengthened further.

Long fibers are preferably cut after the coating and before they are processed to form a green body.

It is possible to use treated individual fibers or fiber bundles. The fiber bundles preferably comprise approximately 1000 to 14,000 individual fibers, with mean diameters of approximately 5 to 10 $\mu$m and a length of approximately 1 to 30 mm. In this way, it is also possible to use commercially available fiber bundles, allowing inexpensive production.

For the gradient material according to the invention, this means that the pressing compounds which have been layered successively into the press mold contain reinforcement fibers in which the quality of the fiber coating increases from the outside inwards. For example, in the core of a subsequent brake disc PyC-coated carbon fibers are used, so that the entire component is made tolerant to damage. Further filling is with pressing compounds which contain fibers of decreasing coating quality, until ultimately fibers with only a slight coating—and in extreme cases even uncoated fibers—are used for the frictional layer. The outermost layer, which then serves as the actual frictional layer, may therefore comprise predominantly or even entirely silicon carbide, since the slightly coated or even uncoated fibers are predominantly or completely converted into silicon carbide during the liquid silicization.

Furthermore, it is possible to achieve the gradient in mechanical and tribological properties not only by using the fiber coating but also by varying both the fiber quality and the fiber length.

The use of short fibers has the further advantage that the filling and pressing operation also orients fibers perpendicular to the pressing plane, thus ensuring a continuous transition of the properties.

All customary reinforcement fibers can be used to produce the material according to the invention. Carbon fibers are preferred. However, other fibers with high hot strength, such as silicon carbide fibers or fibers based on Si/C/B/N, are suitable in principle. Furthermore, glass fibers or metal fibers, for example fibers based on titanium, are suitable. Aramid fibers are also eminently suitable.

These different variables, in combination, make it possible to produce a defined change in the materials' properties over the thickness of the disc.

Exemplary embodiments of the present invention are described in more detail below with reference to the appended drawings, in which.

Figure 1:
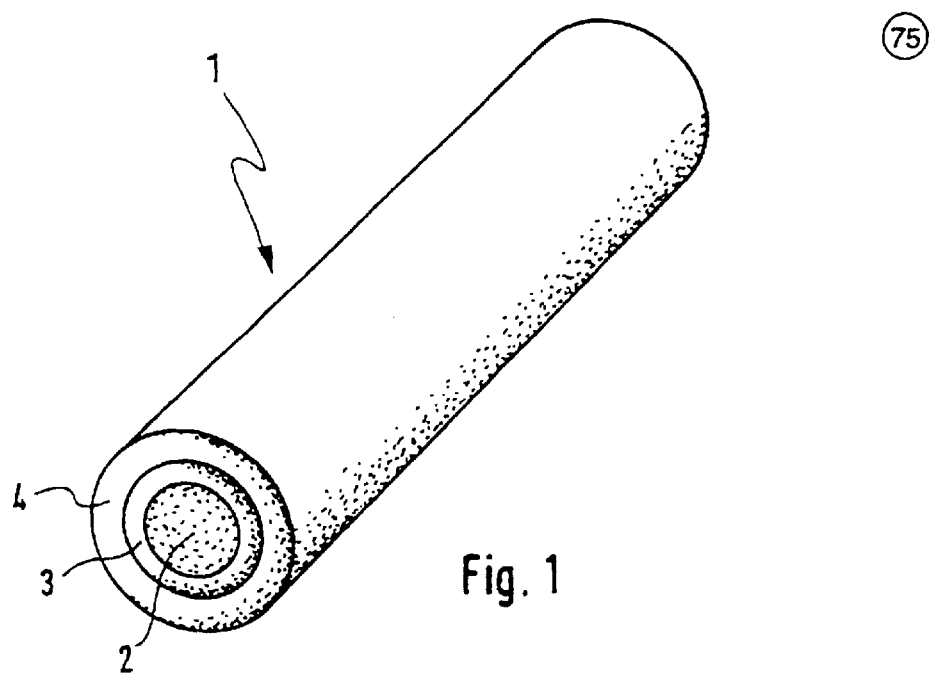
FIG. 1 is a diagrammatic depiction of a cross section through a PyC-coated carbon fiber.

The reinforcement fiber 1 shown in FIG. 1 has an inner core 2 made from a carbon fiber. This core 2 is provided with a coating 3 of pyrolytic carbon. The coating 3 is preferably approximately 100–300 nm thick. An outer layer 4 made from a pyrolyzable binder is preferably applied to the coating 3. The layer 4 is preferably approximately 200–800 nm thick. This binder is, for example, a pyrolyzable resin or resin mixture, preferably selected from the group of phenolic resins. The layer 4 is converted into carbon during the subsequent pyrolysis, and this carbon in turn reacts to form silicon carbide during the infiltration with liquid silicon. The inner region of the reinforcement fiber 1, namely the coating 3 of pyrolytic carbon and the core 2 of the reinforcement fiber 1, which is enclosed by the coating 3, are not affected by the liquid silicon.

These fibers can be produced in various ways. One possible process is eminently suitable for coating long fibers. The long fibers are firstly dipped into a pitch bath and are then dried in a drying station. The fibers which have been coated in this way are finally dipped into a bath containing a pyrolyzable phenolic resin. After they have passed through a further drying station, the long fibers are ready for use and may, for example be cut to the desired length.

A further possible process is suitable both for coating short fibers and for coating long fibers. The fibers are firstly subjected to a CVD coating, for example using methane, and then to a dip coating in a bath containing pyrolyzable phenolic resin.

The production process for the material according to the invention is known per se and is described, for example, in German Patent Application 197 11 829.1.

The mixture for producing the green bodies comprises fibers or fiber bundles, a pyrolyzable binder, e.g. a phenolic resin, and, if appropriate, carbon-containing fillers, such as graphite or soot, as well as further fillers, such as silicon, carbides, nitrides or borides, preferably silicon carbide, titanium carbide or titanium boride in powder form. Examples of further preferred fillers for influencing the pyrolysis kinetics, in particular for accelerating the pyrolysis, are polyvinyl alcohol or methylcellulose. Furthermore, additions of iron, chromium, titanium, molybdenum, nickel or aluminum may be added to the mixture. These additions improve the behavior of the liquid silicon during the infiltration.

The baths may also already contain fillers, such as for example graphite.

The carbon-containing fillers assist with cohesion during production and subsequent pyrolysis of the green body and accelerate the pyrolysis. The further fillers are used to adjust the wear resistance of the subsequent composite ceramic.

The green body may be produced by dry or hot extrusion of granules. The granules may be obtained by pelletizing the components listed above. Following their production, the granules are dried and pressed to form a green body. It is possible to produce the green body near net shape. Since there is little shrinkage during the pyrolysis and infiltration with liquid silicon, remachining costs are low.

However, the mixture described above may also be mixed with heat-curable binders in a kneader, pressed in a mold and heat-cured to form a green body. In this case, the green body or the porous shaped body resulting from the pyrolysis of the green body may be machined further to a desired shape.

The porosity of the shaped body can be set by selecting the additives and the amount thereof.

Exemplary Embodiment 1

Three different pressing compounds were produced from short fibers SCF6 with a length of 6 mm and short fibers SCF3 with a length of 3 mm, produced by SGL, phenolic resin, titanium carbide and graphite filler.

Pressing compound 1 contained 3 mm fibers with exclusively a commercially available epoxy resin coat. Pressing compound 2 contained 6 mm fibers which were coated by impregnation in a pitch solution (Carbores, produced by Rüttgers) and subsequent drying. The coated fibers were then impregnated by immersion in a highly dilute phenolic resin solution and subsequent drying in a circulating-air cabinet at 130° C. Pressing compound 3 contained a mixture of 3 mm and 6 mm fibers in a ratio of 1:2, which, as described above, were firstly dipped into the pitch solution referred to above and then into a concentrated phenolic resin solution. This was again followed by a drying and curing step.

The three pressing compounds were produced from the different coated fibers using a known process. To do this, untreated or treated fibers were mixed with phenolic resin, titanium carbide and graphite as filler in a mixing kneader to form a pressing compound. The fibers formed 38% by volume.

These pressing compounds were used to produce a brake disc. To do this, the near net shape mold of a hot press was filled. The filling took place in five steps without preforming. Firstly, the mold was filled with pressing compound 1; the height of the layer was approx. 13 mm. This was followed by a second layer of pressing compound 2, to a height of approximately 10 mm, a third layer of pressing compound 3, to a height of approximately 20 mm, a fourth layer of pressing compound 2, to a height of approximately 10 mm, and a fifth and final layer of pressing compound 1, to a height of approximately 13 mm. These layers were pressed under a pressure of approximately 80 bar. The result was a disc with a thickness of approximately 25 mm.

Figure 3:
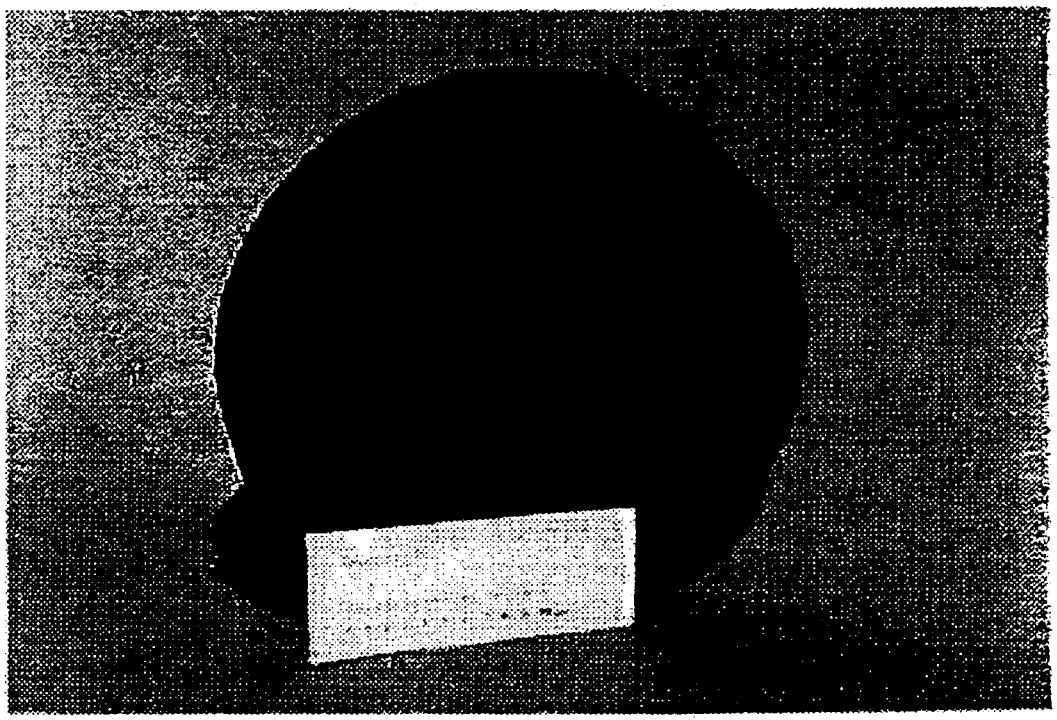
FIG. 3 is a picture of a brake disc which has been produced using the process according to the invention, in the CRP state (green body)

This pressing compound was cured at approximately 150° C. to form a dimensionally stable CRP disc, as shown in FIG. 3. Pyrolysis took place at 800° C. in a pyrolysis furnace under inert gas. The subsequent infiltration with liquid silicon was carried out in vacuo at approximately 1600° C., using molten silicon. The resultant C/SiC body was cooled to room temperature.

The resultant brake disc was tested with brake linings made from the same material with a lower silicon content. The coefficients of friction were very good at 0.55–0.6.

The flexural strengths were determined separately for the individual layers. The 3-point bending strength of the material derived from the pressing compound 1 was approximately 170 MPa with an extension of 0.12%. The 3-point bending strength of the material derived from pressing compound 2 was approximately 91 MPa with an extension of 0.09%. Finally, the 3-point bending strength of the material derived from pressing compound 3 was approximately 67 MPa with an extension of 0.21%.

Exemplary Embodiment 2

The same proportions of short fibers SCF3 with a length of 3 mm and short fibers SCF6 with a length of 6 mm produced by SGL and T 800/6K fibers produced by Toray with a length of 24 mm were used. The 3 mm fibers and 6 mm fibers were firstly provided, as described above, with a layer of pyrolytic carbon and then with a layer of phenolic resin. The 24 mm fibers had a layer of pyrolytic carbon (PyC) applied using a CVD process by means of methane, and a resin coating which was applied by dipping.

The fibers which had been treated in this way were processed to form a pressing compound as described above. The fibers which had been coated according to the invention again constituted 38%. These fibers were mixed with phenolic resin, titanium carbide and graphite as filler, in a mixing kneader, to form a pressing compound.

Three different pressing compounds were produced, as described above, with pressing compounds 1 and 2 having the compositions described above and pressing compound 3 containing a mixture of 24 mm fibers and 6 mm fibers, in a ratio of 1:2.

The near net shape mold of the hot press was filled in five steps without preforming, as described above, the filling height of the layers of the pressing compound 1 being in each case 10 mm, and the height of the layers of the pressing compound 2 in each case being approximately 12 mm. The layered arrangement was pressed at 80 bar. The result was a disc with a thickness of approx. 25 mm.

The pressing compound was cured at approximately 150° C. to form a dimensionally stable CRP disc. Pyrolysis took place at 800° C. in a pyrolysis furnace under inert gas. The subsequent silicization was carried out in vacuo at approximately 1600° C. using molten silicon. The resultant C/SiC body was cooled to room temperature.

The coefficients of friction, which were measured as described above, were once again 0.55–0.6. The 3-point bending strength of the material derived from pressing compound 2 (thick resin coating) was approx. 67 MPa with an extension of 0.21%. The 3-point bending strength of material derived from pressing compound 3 (PyC-resin coating) was approximately 107 MPa with an extension of 0.42%.

Figure 2:
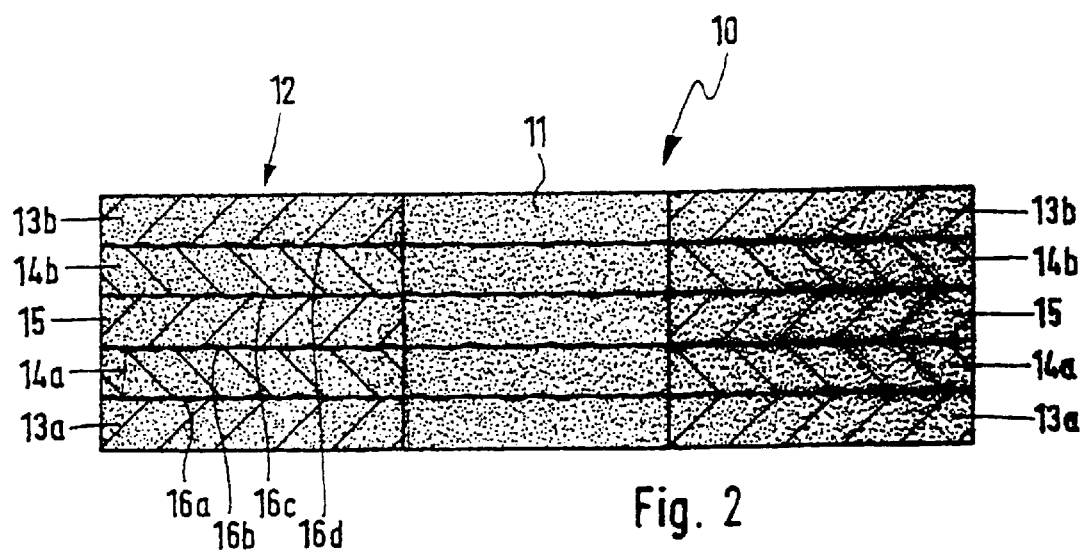
FIG. 2 is a diagrammatic cross section through a gradient material according to the invention.

FIG. 2 diagrammatically depicts a cross section through a brake disc 10 produced using this process. The central opening in the brake disc is denoted by 11, and the disc material itself is denoted by 12. The brake disc 10 comprises the gradient material 12 according to the invention. The outermost regions 13a, 13b at the surface of the brake disc 10 form the frictional surfaces. They comprise wear-resistant, high-strength ceramic substance. The central region 15 in the interior of the brake disc 10 forms a core which is tolerant to damage. It comprises a carbon-containing material with relatively unpronounced ceramic properties, lacking in particular the brittleness which is typical of ceramic materials. The regions 14a and 14b form intermediate regions, the material of which is not as strongly ceramic as that of the outer regions 13a, 13b but also not as carbonaceous as the material of the central region 15.

The phase boundaries 16a, b, c, and d between the individual regions 13a, b, 14a, b, 15 are not sharply emphasized, but rather are more gradual. Preferably, they merge into one another. The process according to the invention ensures a gradual transition and therefore good cohesion between the regions. Additional joining processes are not required.

FIG. 3 shows a brake disc which has been produced in accordance with Exemplary Embodiment 1 in the CRP state i.e. after pressing but before pyrolysis of the green body and before infiltration with liquid silicon.

Figure 4:
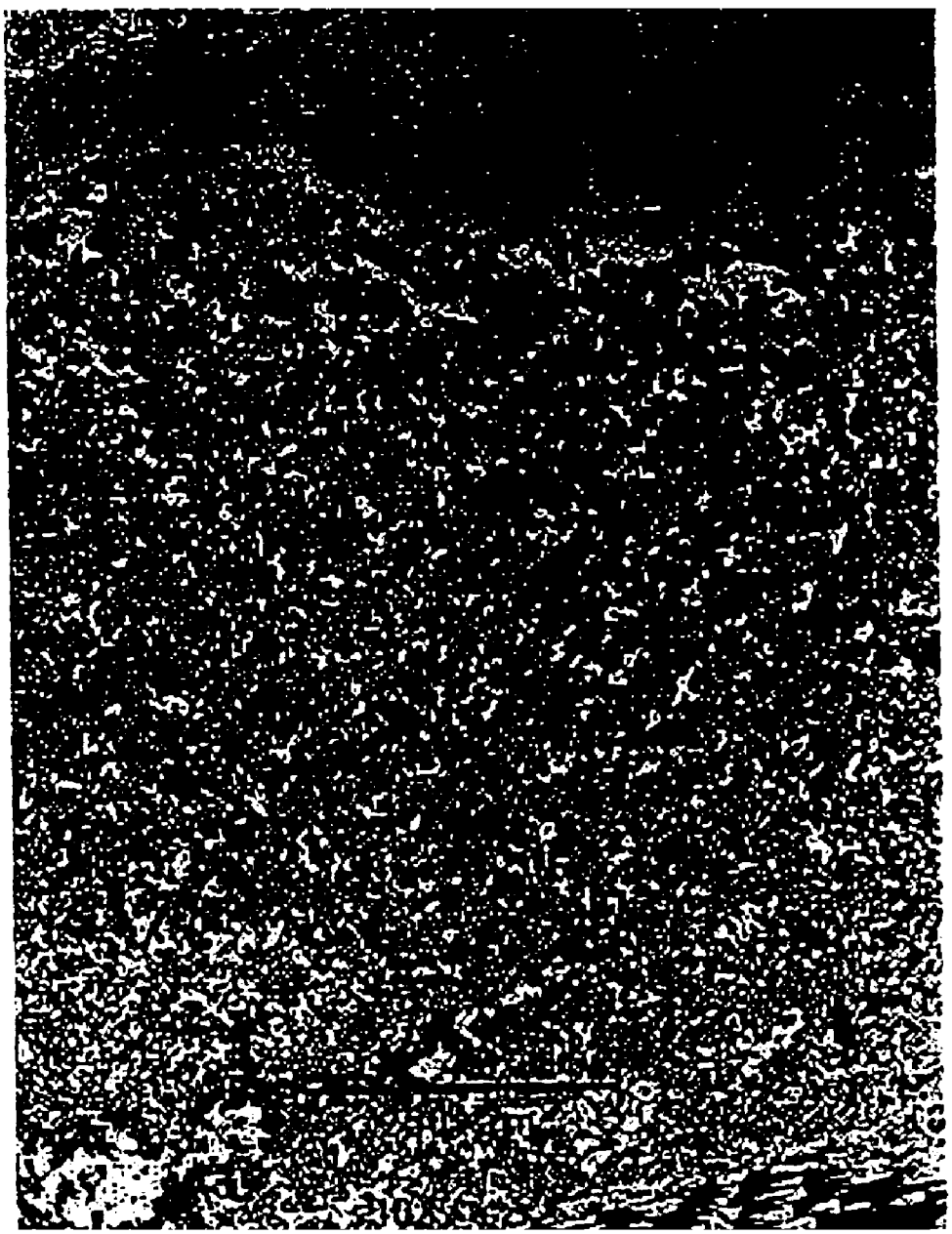
FIGS. 4 and 5 are microsections through the gradient structure of the brake disc shown in FIG. 3.
Figure 5:
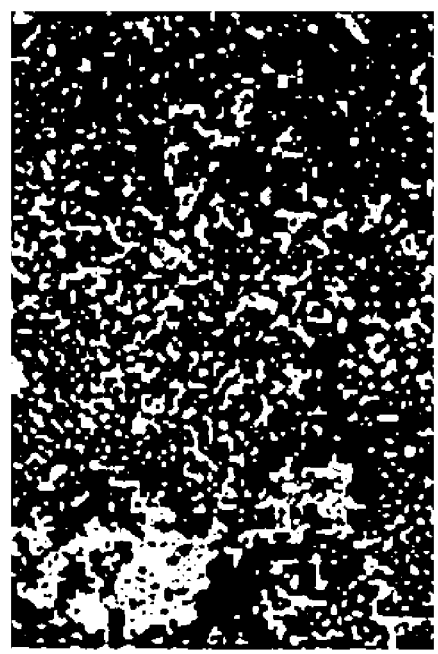

FIGS. 4 and 5 show microsections through the gradient structure of the porous shaped body shown in FIGS. 2 and 3. The various layers which merge seamlessly into one another can be seen clearly.

What is claimed is:

1. A process for producing a fiber composite material comprising filling (A) fibers with a high hot strength, based on at least one of carbon, silicon, boron and nitrogen, said fibers being coated with a layer of a pyrolyzable binder and reaction bonded to a silicon-based matrix by infiltrating molten liquid silicon into a shaped porous body, (B) a plurality of pressing compounds produced from fibers of different qualities and/or in different proportions, and (C) a binder into a press mold and then pressing the same to form a green body, wherein the press mold is filled with the pressing compounds in a plurality of successive steps and differently coated fibers are used for the various pressing compounds.

2. A process according to claim 1, wherein the press mold is filled without preforming.

3. A process according to claim 1, wherein said fibers have been coated with a layer of pyrolytic carbon and with a layer of a pyrolyzable binder.

4. A process according to claim 1, comprising filling the press mold with the differently coated fibers in such a manner that a green body is formed from which it is possible to obtain a fiber composite material with a substantially graphite core and a substantially ceramic surface.

5. A process according to claim 4, wherein fibers with a pronounced coating are used for the substantially graphite core and fibers with a thin coating and/or fibers without a coating are used for the substantially ceramic surface.

6. A process according to claim 4, wherein fibers with a coating which is relatively unreactive with respect to the matrix are used for the substantially graphite core and fibers with a coating which is more reactive with respect to the matrix are used for the substantially ceramic surface.

7. A process according to claim 1, wherein substantially short fibers or short fiber bundles are used to produce the pressing compounds.

8. A process according to claim 1, wherein fibers of different lengths are used for the various pressing compounds.

9. A process according to claim 1, wherein fibers made from different materials are used for the various pressing compounds.

10. A process according to claim 1, wherein the individual components are processed into granules to produce the pressing compounds, and the granules are dried and pressed to form the green body.

11. A process according to claim 10, wherein the granules are pressed by dry or hot extrusion.

12. A process according to claim 1, wherein the individual components are mixed in a kneader to produce the pressing compound and the mixture is pressed to form a green body.

13. A process according to claim 1, wherein a heat-curable binder is added to the pressing compound, and the pressed green body is cured by heating.

14. A process according to claim 1, wherein the individual components are processed into granules by being pelletized.

* * * * *